United States Patent [19]

Asahina

[11] Patent Number: 4,751,587

[45] Date of Patent: Jun. 14, 1988

[54] IMAGE RECORDING AND REPRODUCING APPARATUS USING DIFFERENTIAL DATA COMPRESSION AND EXPANSION TECHNIQUES

[75] Inventor: Kiyotaka Asahina, Ootawara, Japan

[73] Assignee: Kabushiki Kaisha Toshiba, Kawasaki, Japan

[21] Appl. No.: 871,321

[22] Filed: Jun. 6, 1986

[30] Foreign Application Priority Data

Jun. 10, 1985 [JP] Japan .................................. 60-125466

[51] Int. Cl.⁴ .......................... H04N 5/76; H04N 7/12
[52] U.S. Cl. .................................... 358/335; 358/135;
358/136; 358/138; 358/141; 358/342
[58] Field of Search ............... 358/335, 342, 133, 135,
358/136, 138, 141; 360/47-48

[56] References Cited

U.S. PATENT DOCUMENTS

| | | | |
|---|---|---|---|
| 3,071,727 | 1/1963 | Kitsopoulos | 358/135 X |
| 3,767,847 | 10/1973 | Haskell et al. | 358/135 |
| 3,772,458 | 11/1973 | May et al. | 358/135 |
| 3,825,832 | 7/1974 | Frei et al. | 358/135 |
| 4,417,276 | 11/1983 | Bennett et al. | 358/335 X |
| 4,499,506 | 2/1985 | Takahashi et al. | 358/335 X |
| 4,511,929 | 4/1985 | Maeda et al. | 358/335 X |
| 4,546,383 | 10/1985 | Abramatic et al. | 358/135 X |

Primary Examiner—Raymond F. Cardillo
Assistant Examiner—W. R. Young
Attorney, Agent, or Firm—Finnegan, Henderson Farabow, Garrett and Dunner

[57] ABSTRACT

An image recording and reproducing apparatus receives a string of image data consisting of image data of a plurality of frames. An image encoding section sequentially calculates difference image data for pixels of adjacent image data of the received image data. At least one reference image data among the string of image data and respective difference image data calculated by the image encoding section are recorded by a recording unit. The image data read out from the recording unit is sequentially calculated with reference to the reference image data, and the string of image data is decoded.

13 Claims, 5 Drawing Sheets

4,751,587

IMAGE RECORDING AND REPRODUCING APPARATUS USING DIFFERENTIAL DATA COMPRESSION AND EXPANSION TECHNIQUES

BACKGROUND OF THE INVENTION

The present invention relates to an image recording and reproducing apparatus for recording/reproducing image data and, in particular, image data used for medical diagnosis.

In a CT (computed tomography apparatus) known as a radiation tomographic imaging apparatus, tomographic image data of an object under examination is converted into display data and is displayed on a television (TV) monitor. In an apparatus of this type, a means is required for recording digital image data on a recording medium such as a magnetic disk or optical disk, and for reproducing and displaying the recorded image data.

This type of image data is expressed using a finite number of grid-like spaces, i.e., an image matrix (to be referred to as matrix hereinafter). Image data consists of gradation data for each pixel of the matrix. In general, the resolution of an image depends on the number of pixels in the image, i.e., the matrix size. For this reason, in order to record digital image data having a high resolution and a large number of gray levels using a CT apparatus or the like, a recording medium having a large capacity must be provided. For example, when the matrix size is 320×320, the number of pixels of the image is 102,400.

Such image data is recorded or reproduced in units of images, i.e., using all the pixels in the matrix. This requires a recording medium having a large capacity, which corresponds to the matrix size, as described above.

Various proposals have been conventionally made to reduce the recording capacity required for image recording and to allow recording of a large amount of image data on a medium having the smallest possible recording capacity. As disclosed in Japanese Patent Disclosure (Kokai) No. 58-159731, a portion of obtained image data which is not required for diagnosis, e.g., a portion corresponding to air in a specific object portion under examination, is removed and data of only effective region of the object is recorded, thereby allowing reduction in the required recording capacity.

Recently, in order to obtain an image suitable for medical diagnosis, the slice width (thickness) in a CT apparatus has become thinner. With this trend, the number of images handled by the apparatus has increased. In actual diagnosis, a predetermined number of tomographic images are obtained at predetermined intervals. This predetermined number has also increased. In order to cope with such an increase in the amount of image data to be processed, removal of data portions corresponding to air in the object is not sufficient. Another measure must be taken to allow recording of a larger amount of image data on a medium having a small recording capacity.

SUMMARY OF THE INVENTION

It is an object of the present invention to provide an image recording and reproducing apparatus which can record or reproduce a large amount of image data using a recording medium having a small recording capacity.

In order to achieve the above object of the present invention, there is provided an image recording and reproducing apparatus which has an image encoding section for sequentially receiving a string of image data consisting of a plurality of frames, and for sequentially calculating difference image data consisting of difference data between pixels of adjacent image data of the received image data; a recording section for recording reference image data for at least one frame among the string of image data and each difference image data calculated by the image encoding section; and an image decoding section for sequentially calculating image data read out from the recording unit using the reference image data and for decoding the string of image data.

According to the present invention, the string of image data is recorded in the forms of image data consisting of sequential difference data, and at least one original image data. Therefore, an image recording and reproducing apparatus which has an improved image data recording efficiency and which can record and reproduce a large amount of image data using a recording medium having a small recording capacity is provided.

DETAILED DESCRIPTION OF THE PREFERRED EMBODIMENTS

Figure 1:
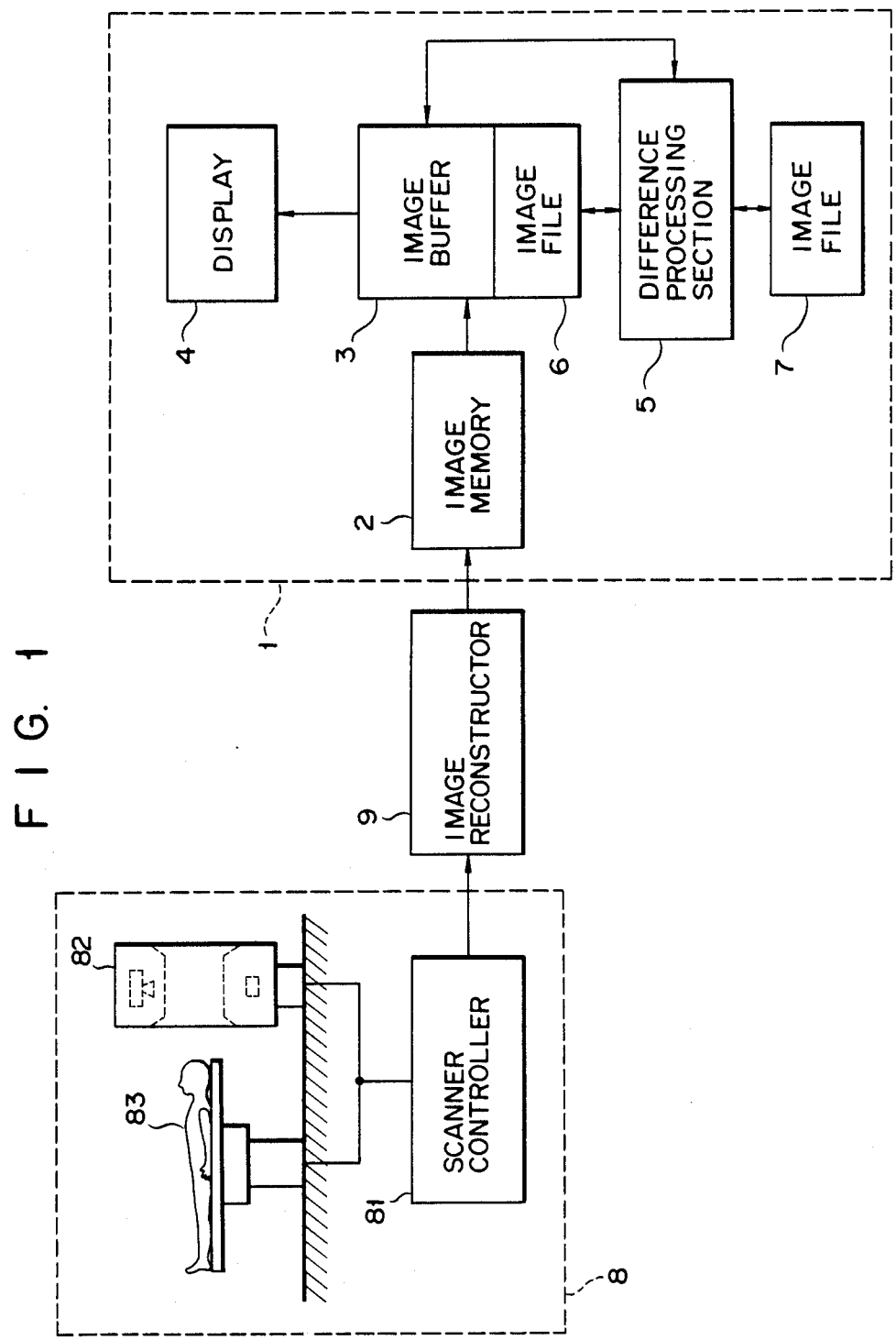
FIG. 1 is a block diagram schematically showing the configuration of a CT apparatus to which an image recording and reproducing apparatus according to a first embodiment of the present invention is applied.

FIG. 1 shows the configuration of a CT apparatus adopting an image recording and reproducing apparatus according to an embodiment of the present invention.

Image recording and reproducing apparatus 1 has image memory 2, image buffer 3, display 4, difference processing section 5, and image files 6 and 7.

Image memory 2 temporarily stores image data supplied from image reconstructor 9 (to be described later). Image buffer 3 stores image data transferred from image memory 2. Display 4 displays image data transferred from buffer 3 as a visual image. Section 5 performs differential processing of image data which is sequentially output from image buffer 3. Image files 6 and 7 record at least one image data (to be described later) and the processing results of section 5. File 6 comprises e.g., a hard disk unit or the like, and is used to temporarily store image data so as to perform image processing or image display immediately after recording. File 7 comprises, e.g., an optical disk or the like, and is used to store image data for a long period of time to allow image processing or image display at a later time.

The image data is tomographic image data of an object under examination, which is collected by CT scanner 8 and reconstructed by reconstructor 9, and is then transferred to image memory 2. CT scanner 8 has scanner controller 81, gantry 82, and bed 83, as shown in FIG. 1. Gantry 82 has an X-ray source and an X-ray detector, and obtains projection data of an object inserted into the opening of gantry 82 from many directions. Bed 83 has the object on its top plate, and can move vertically or forward/backward. In order to obtain a tomographic image of the object, the object is placed on the top plate of bed 83 and is inserted into gantry 82. The top plate having the object placed thereon is moved while scanning of the object is performed, thereby taking tomographic images of a plurality of slices. In general, tomographic image data obtained by scanner 8 and reconstructor 9 is transferred as a string of image data consisting of a plurality of image data aligned at predetermined intervals along the axis of the object.

Figure 2:
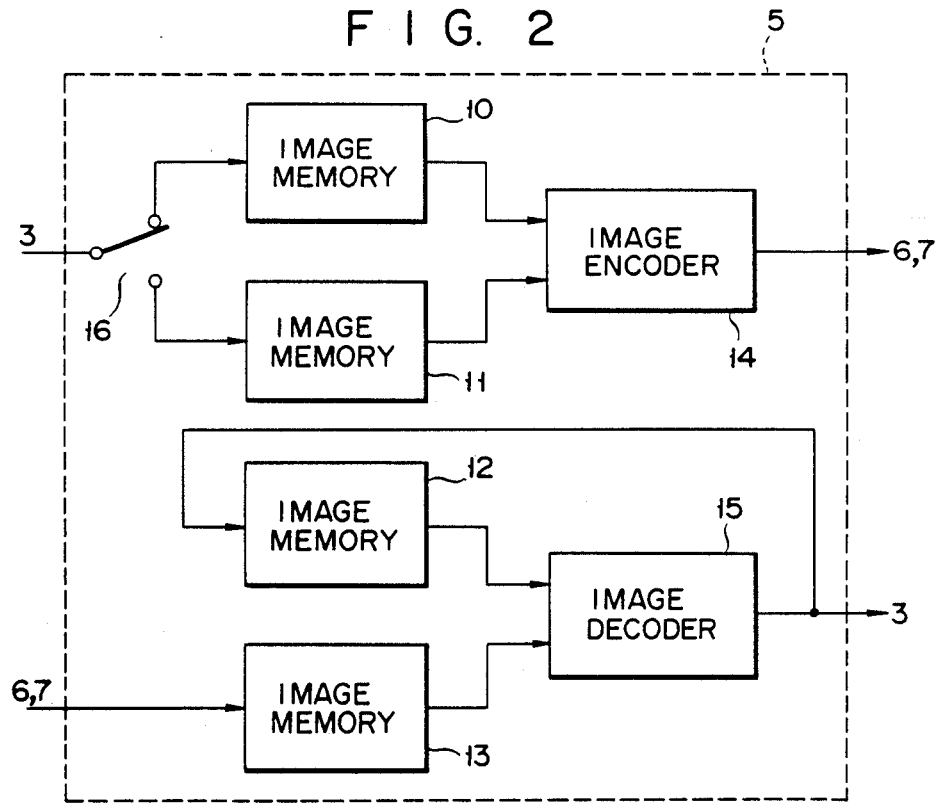
FIG. 2 is a block diagram showing a model of the configuration of a difference processing section in the apparatus shown in FIG. 1.

Difference processing section 5 has image memories 10 to 13, image encoder 14, image decoder 15, and switch section 16, as shown in FIG. 2.

In the image recording mode, a string of tomographic image data (original image data) output from image buffer 3 is alternately switched by switch section 16 in accordance with a predetermined transfer order, and is sequentially stored in first and second image memories 10 and 11. Encoder 14 calculates the differences between adjacent pixels of the original image data read out from memories 10 and 11. The difference image data obtained as the encoded result of encoder 14 is stored in image files 6 and/or 7. In this case, image files 6 and/or 7 record the first and last original image data in the original image data string without encoding, in addition to the difference image data. The original image data can also be recorded in image files 6 and/or 7 as difference image data between the first or last original image data and zero-cleared image data. Image data is normally recorded in both files 6 and 7. However, if it is not necessary to process the image data immediately after recording, it can be recorded in only image file 7.

In the image reproducing mode, the image data recorded in image file 6 or 7 is sequentially read out in accordance with the recorded order or in an order opposite thereto, and is stored in fourth image memory 13. Third image memory 12 stores most recent decoded image data from image decoder 15. Decoder 15 performs subtraction (or addition) of the data read out from third and fourth image memories 12 and 13 so as to decode the recorded contents into a string of tomographic image data. The decoded image data is stored in third image memory 12, as described above, and is also transferred to image buffer 3.

Encoder 14 has a subtracter which performs subtraction of pixel values (gray levels of the pixels), at the same addresses of the matrix of the two images stored in first and second image memories 10 and 11. Decoder 15 has a subtracter (or an adder) which performs subtraction (or addition) of the pixel values (gray levels of the pixels), at the same addresses of the two images stored in third and fourth memories 12 and 13.

The mode of operation of the CT apparatus having the above configuration will be described with reference to FIGS. 3 to 5.

(Recording of Image Data)

Figure 3:
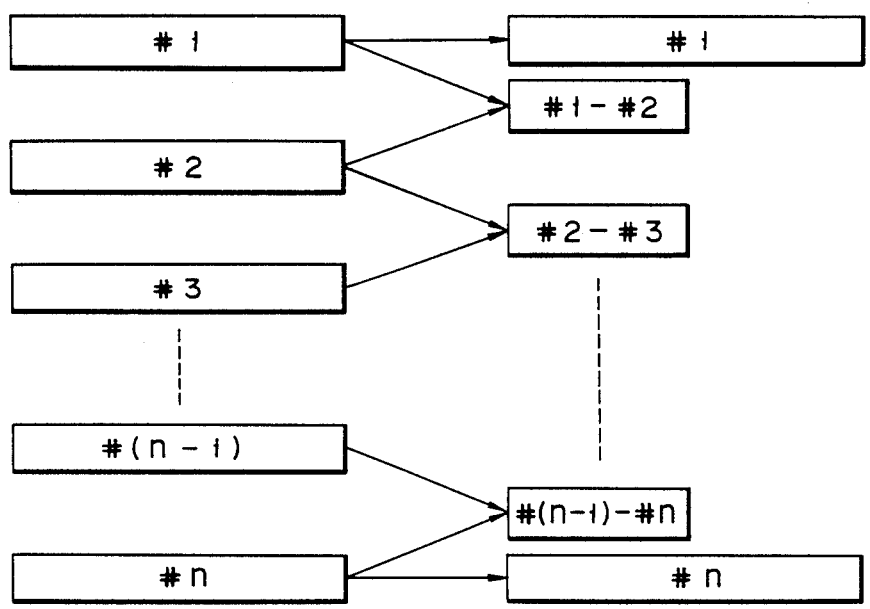
FIGS. 3 to 5 are views for explaining the mode of operation of the apparatus shown in FIG. 1.

Recording of image data by image recording and reproducing apparatus 1 of the present invention is performed in the following manner (FIG. 3).

A string of tomographic image data reconstructed by reconstructor 9 is stored in image buffer 3 through image memory 2. The tomographic image data string is then read out from image buffer 3 and is supplied to difference processing section 5.

The tomographic image data supplied to section 5 is switched by switch section 16 in accordance with the predetermined transfer order, and is alternately written in first and second image memories 10 and 11. For example, assume that a string of tomographic image data is numbered #1, #2, #3, ..., #n in the transfer order.

In this case, data #1 is stored in image memory 10, and image #2 is stored in image memory 11. Data #1 and #2 stored in memories 10 and 11 are read out therefrom, and are supplied to encoder 14 to calculate difference "#1−#2" between corresponding pixels.

Similarly, image data is sequentially read out from image buffer 3, and differences "#2−#3", "#3−#4", ..., "#(n−1) −#n" are sequentially calculated.

The encoded results of encoder 14 are sequentially recorded image files 6 and/or 7. Only original data #1 and #n are directly recorded in files 6 and/or 7.

In this manner, when the differences between the adjacent pixels are calculated for a string of tomographic image data #1 to #n, since there is an extremely small change between the spatially adjacent tomographic images, the total amount of difference image data is much smaller than that of the original image data. Therefore, the recording capacity of image files 6 and 7 can be reduced as compared to that of conventional apparatuses, and the number of images which can be recorded can be increased if the recording capacity of the files remains the same.

(Reproduction of Image Data)

Figure 4:
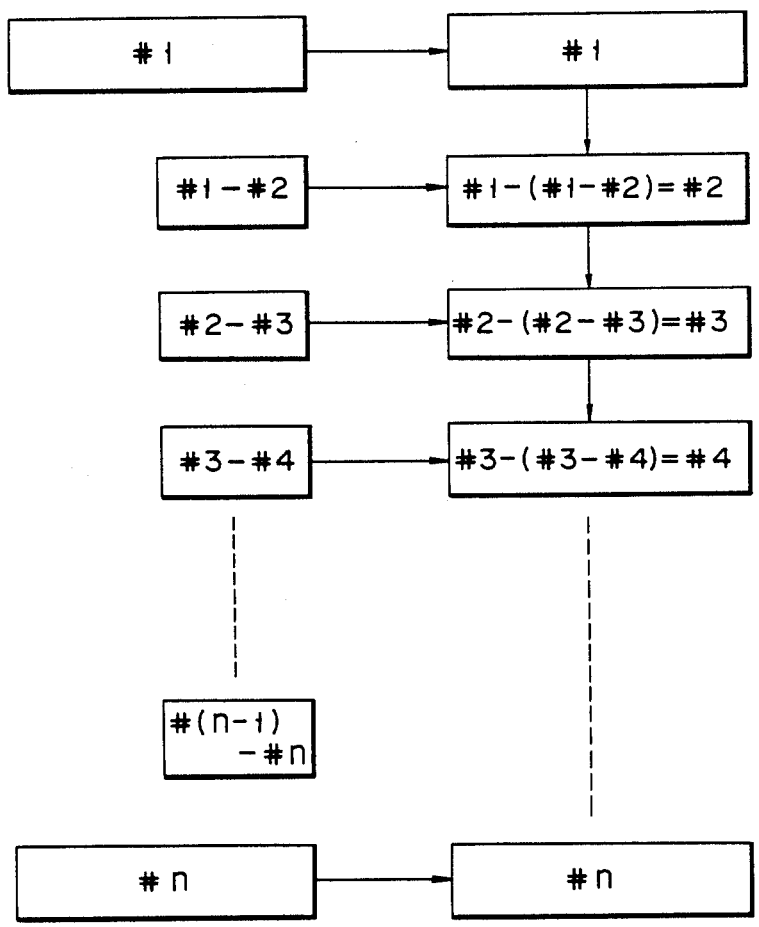
Figure 5:
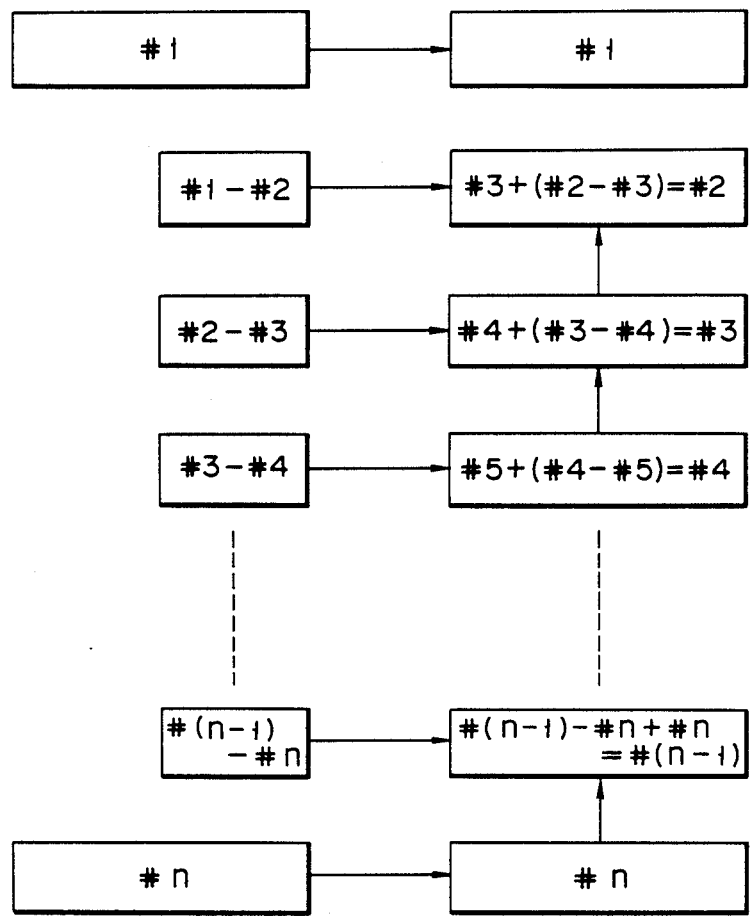

Reproduction of image data recorded in image file 6 or 7 is performed in the following manner (FIGS. 4 and 5).

The image data stored in image file 6 or 7 can be reproduced in the order of data #1, #2, #3, ..., #n or in the reverse order.

With reference to FIG. 4, a case will be described wherein the image data recorded in image file 6 or 7 is reproduced in the former order, using difference processing section 5.

In this case, data #1 and #n are recorded without encoding and can therefore be reproduced without decoding. However, since the remaining data is recorded as difference data, it must be decoded by decoder 15. The decoding is performed in the following manner.

Data #1 read out from image file 6 or 7 through fourth image memory 13 is transferred to image buffer 3 and third image memory 12 through decoder 15, since it need not be decoded. Next data (#1−#2) read out from image file 6 or 7 is transferred to memory 13. Data #1 and (#1−#2) in memories 12 and 13 are supplied to decoder 15. Decoder 15 decodes data #2 by subtraction "#1−(#1−#2)". Decoded data #2 is transferred to image buffer 3 and memory 12. Decoder 15 performs a subtraction "#2−(#2−#3)" to obtain data #3. Similarly, decoder 15 sequentially decodes data #4, #5, ... , #(n−1).

In this manner, data #2 to #(n−1) are decoded, and data #1 and decoded data #2 to #(n−1) are stored in image buffer 3. Upon this operation, a tomographic image data string for all the slices of the object can be reproduced. When the image data is reproduced and stored in image buffer 3 in this manner, reproduction from image file 6 or 7 need not be performed each time, and a tomographic image data string can be immediately displayed as needed.

As shown in FIG. 5, when image data is reproduced, it can be reproduced by decoding in the order of data #(n−1) to #2, which is the reverse of that shown in FIG. 4. In this case, decoder 15 performs addition such as "[#(n−1)−#n]+#n".

When first and last data #1 and #n are recorded in the form of original data, decoding of the remaining data with reference to the first and last data can be performed. This is quite effective when an error occurs in the recording data for some reason.

Figure 6:
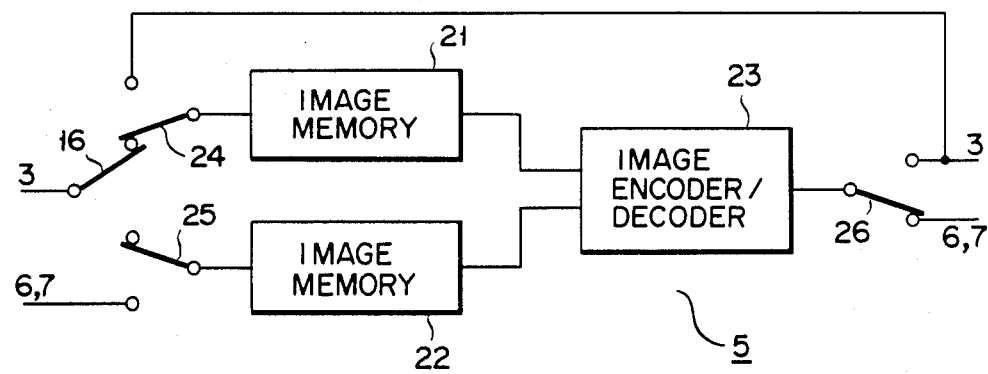
FIG. 6 is a block diagram showing the model of a difference processing section in an image recording and reproducing apparatus according to a second embodiment of the present invention.

In the above description, section 5 is divided into the image recording system (first and second image memories 10 and 11, image encoder 14, and switch section 16) and the image reproducing system (third and fourth image memories 12 and 13, and image decoder 15). However, each of the image recording and reproducing systems can comprise two image memories and a single adder/subtracter, as in the second embodiment of the present invention. As shown in FIG. 6, each system can comprise two image memories 21 and 22 and image data encoder/decoder 23 comprising an adder/subtracter. In the apparatus of FIG. 6, selectors 24, 25, and 26 are arranged at the inputs of image memories 21 and 22 and the output of encoder/decoder 23, respectively.

In this CT apparatus, the differences between adjacent images are calculated for a string of tomographic image data, and the calculated results are recorded in image file 6 and/or 7. With this arrangement, the recording data can be reduced. Therefore, a large number of images can be recorded in image file 6 or 7.

In order to allow image decoding of the tomographic image data string, first data (#1) and last data (#n) are recorded without encoding. Therefore, even if an error occurs and decoding in the forward direction cannot be performed, decoding can still be performed in the reverse direction, enabling reliable image reproduction.

Figure 7:
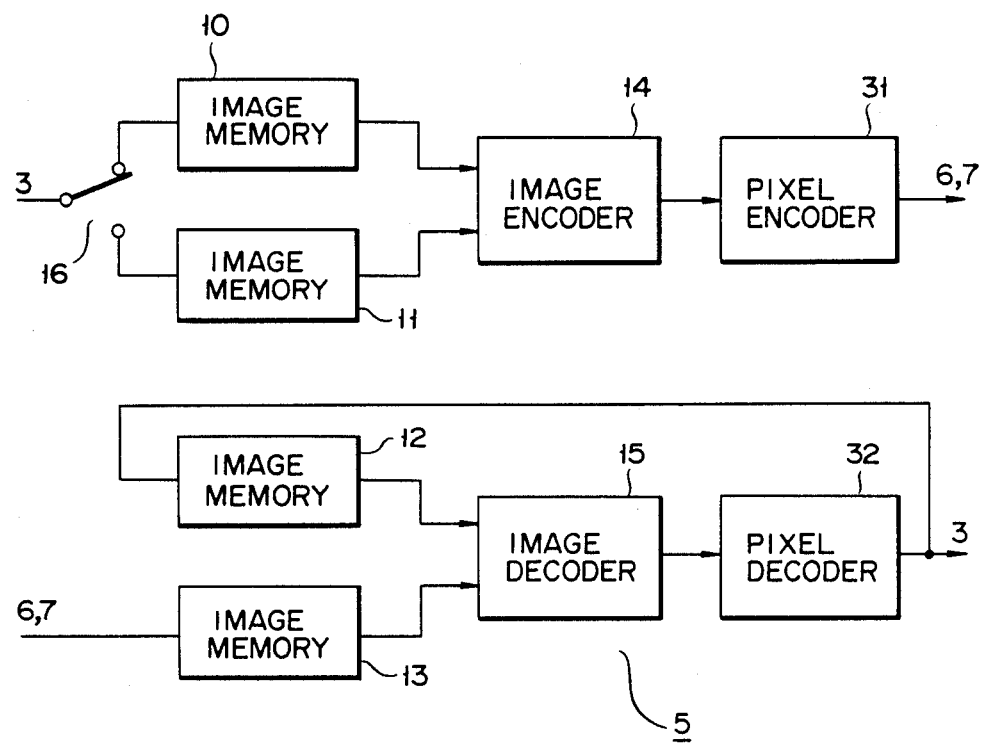
FIG. 7 is a block diagram showing a model of the configuration of a difference processing section of an image recording and reproducing apparatus according to a third embodiment of the present invention.

When image data is to be recorded after compression, the apparatus can have an arrangement as shown in FIG. 7. In this third embodiment, difference image data obtained by image encoder 14 in difference processing section 5 is further subjected to difference calculation between pixels, in accordance with the transfer/scanning order of image data by pixel encoder 31. The obtained data is recorded in image file 6 and/or 7. In the reproduction mode, the image data read out in accordance with the same transfer/scanning order is integrated and decoded into the original difference image data by image decoder 32. The data is further decoded by a pixel decoder. With this arrangement, when portions with close gray levels are adjacent in the difference data, data can be effectively compressed. Another effective compression of recording data can be performed when a technique disclosed in Japanese Patent Disclosure (Kokai) No. 58-159731 is used. In this technique, a data portion corresponding to air around a specific object portion under examination is removed from the image data, and only data for an effective region of the object is recorded, thereby reducing the amount of data to be recorded. In accordance with still another technique, a region of interest can be set, and only image data within this region is recorded, thereby reducing the amount of recording data.

Although the present invention has been described with reference to preferred embodiments, the present invention is not limited thereto. Various changes and modifications can be made within the spirit and scope of the present invention.

In the above embodiments, among a string of tomographic image data, the first data (data #1) and the last data (#n) are recorded without encoding. However, as can be seen from the fact that decoding can be performed in either the forward or reverse direction, at least one image data other than the first and last data can be set for decoding, and the entire tomographic image data string can be reproduced. In order to allow easy reproduction in case of an error, original image data for every predetermined number of image data can be recorded without encoding, and the remaining data can be recorded as difference data.

In the above embodiments, the tomographic image data is recorded and reproduced. However, the image recording/reproducing apparatus of the present invention is not limited to a specific type of image data. In addition, the amount of recording data reduction effect is more notable if the images requiring difference calculation have only small differences therebetween. Therefore, the apparatus of the present invention provides a significant effect in recording/reproduction of a string of image data which are associated with time or space. An image which is associated with time includes, e.g., an X-ray image or the like, which changes as time elapses during injection of a contrast medium.

What is claimed is:

1. An image recording and reproducing apparatus comprising:

image encoding means for sequentially receiving a string of image data, including image data of a plurality of image frames, and for sequentially calculating differential image data between corresponding pixels of said received image data, said image encoding means comprising a pair of image storage means for alternately storing, in units of frames, the string of image data received, and subtracting means for subtracting corresponding pixels of the image data stored in said image storage means;

recording and reproducing means for recording and reproducing reference image data for at least two image frames from among the string of received image data and also for recording and reproducing said differential image data calculated by said image encoding means; and image decoding means for sequentially decoding a string of differential image data read out from said recording and reproducing means using a selected one of said recorded reference image data.

2. An apparatus according to claim 1, wherein the string of image data is medical diagnostic image data.

3. An apparatus according to claim 1, wherein the string of image data is tomographic image data for a series of a plurality of adjacent slices of an object.

4. An apparatus according to claim 1, wherein the string of image data is a string of image data which is continuous over time for an identical portion of an object.

5. An apparatus according to claim 1, wherein said image decoding means comprises first storage means for sequentially storing, in units of frames, image data obtained by decoding; second storage means for sequentially storing, in units of frames, a string of image data read out from said recording means; and adding means for adding corresponding pixels of image data stored in said first and second storage means to decode the difference image data into the original image data, and for updating said first storage means with the decoded image data.

6. An apparatus according to claim 1, wherein said image encoding and decoding means comprise a pair of storage means for storing image data of two frames to be subjected to encoding and decoding; operating means for subtracting corresponding pixels of the image data stored in said pair of storage means in a recording mode, and for adding the corresponding pixels of the image data stored in said pair of storage means in a reproduction mode; and switching means for switching said pair of storage means and said operating means in the recording and reproduction modes.

7. An image recording and reproducing apparatus comprising:
  image encoding means for sequentially receiving a string of image data, including image data of a plurality of image frames, and for sequentially calculating differential image data using corresponding pixels of adjacent data of the received image data, said image encoding means comprising a pair of image storage means for alternately storing, in units of frames, the string of image data sequentially supplied, and subtracting means for subtracting said corresponding pixels of said image data stored in said image storage means;
  pixel encoding means for converting the differential image data into differential data representative of adjacent pixels;
  recording and reproducing means for recording and reproducing reference image data for at least two image frames from among the string of image data and also for recording and reproducing each differential image data calculated by said image encoding means;
  image decoding means for sequentially decoding a string of differential image data read out from said recording and reproducing means using a selected one of said recorded reference image data; and
  pixel decoding means for accumulating the adjacent pixels of image data read out from said recording and reproducing means in a predetermined scanning order and for obtaining decoded image data.

8. An apparatus according to claim 7, wherein the string of image data is medical diagnostic image data.

9. An apparatus according to claim 7, wherein the string of image data is tomographic image data for a series of a plurality of adjacent slices of an object.

10. An apparatus according to claim 7, wherein the string of image data is a string of image data which is continuous over time for an identical portion of an object.

11. An apparatus according to claim 7, wherein said image decoding means comprises first storage means for sequentially storing, in units of frames, image data obtained by decoding; second storage means for sequentially storing, in units of frames, a string of image data read out from said recording means; and adding means for adding corresponding pixels of image data stored in said first and second storage means to decode the difference image data into the original image data, and for updating said first storage means with the decoded image data.

12. An apparatus according to claim 7, wherein said image encoding and decoding means comprise a pair of storage means for storing image data of two frames to be subjected to encoding and decoding; operating means for subtracting corresponding pixels of the image data stored in said pair of storage means in a recording mode, and for adding the corresponding pixels of the image data stored in said pair of storage means in a reproduction mode; and switching means for switching said pair of storage means and said operating means in the recording and reproduction modes.

13. A method for recording and reproducing an image comprising:
  sequentially receiving a string of image data, including image data of a plurality of image frames, and sequentially calculating differential image data, including differential data between corresponding pixels of said received image data;
  recording in a recording means reference image data for at least two of said image frames and also recording each differential image data calculated; and
  sequentially calculating image data from said recorded differential image data using a selected one of said recorded reference image data to decode said differential image data.

* * * * *